(12) United States Patent
Marshall et al.

(10) Patent No.: US 11,656,522 B2
(45) Date of Patent: May 23, 2023

(54) SOLAR TEMPERATURE REGULATION SYSTEM FOR A FLUID

(71) Applicant: E INK CORPORATION, Billerica, MA (US)

(72) Inventors: John L. Marshall, Sedgwick, ME (US); Richard J. Paolini, Jr., Framingham, MA (US); Jay William Anseth, Canton, MA (US); Joanna F. Au, Boston, MA (US)

(73) Assignee: E Ink Corporation, Billerica, MA (US)

( * ) Notice: Subject to any disclaimer, the term of this patent is extended or adjusted under 35 U.S.C. 154(b) by 388 days.

(21) Appl. No.: 16/582,519

(22) Filed: Sep. 25, 2019

(65) Prior Publication Data

US 2020/0103719 A1    Apr. 2, 2020

Related U.S. Application Data

(60) Provisional application No. 62/738,323, filed on Sep. 28, 2018.

(51) Int. Cl.
| | |
|---|---|
| *G02F 1/167* | (2019.01) |
| *G02F 1/1334* | (2006.01) |
| *G02F 1/1333* | (2006.01) |
| *G02F 1/1335* | (2006.01) |
| *G02F 1/1675* | (2019.01) |

(52) U.S. Cl.
CPC ............ *G02F 1/167* (2013.01); *G02F 1/1334* (2013.01); *G02F 1/133348* (2013.01); *G02F 1/133516* (2013.01); *G02F 1/133354* (2021.01); *G02F 2001/1678* (2013.01); *G02F 2201/52* (2013.01)

(58) Field of Classification Search
CPC .............. H01L 25/0753; H01L 25/167; H01L 2924/00; H01L 2924/0002; H01L 33/32; H01L 33/50; H01L 33/504; H01L 33/507; H01L 33/56; H01L 33/62; G02F 1/167; G02F 1/133348; G02F 1/1334; G02F 1/133516; G02F 1/1675; G02F 1/1685; G02F 2001/1678; G02F 1/133354; G02F 1/1676; G02F 2201/083; G02F 2201/52
See application file for complete search history.

(56) References Cited

U.S. PATENT DOCUMENTS

| | | | |
|---|---|---|---|
| 6,241,921 B1 | 6/2001 | Jacobson et al. | |
| 6,645,406 B1 * | 11/2003 | Slyne ................... | B29C 48/131 264/40.7 |
| 6,866,760 B2 | 3/2005 | Paolini, Jr. et al. | |
| 6,922,276 B2 | 7/2005 | Zhang et al. | |
| 6,982,178 B2 | 1/2006 | LeCain et al. | |
| 7,002,728 B2 | 2/2006 | Pullen et al. | |
| 7,012,600 B2 | 3/2006 | Zehner et al. | |
| 7,072,095 B2 | 7/2006 | Liang et al. | |
| 7,075,502 B1 | 7/2006 | Drzaic et al. | |

(Continued)

*Primary Examiner* — Brandi N Thomas
(74) *Attorney, Agent, or Firm* — Brian D. Bean

(57) ABSTRACT

A temperature regulation system includes a laminate material that has a first light transmissive electrode layer, a rear electrode layer, and a bistable electrophoretic medium disposed between the first and second electrode layer. The electrophoretic medium includes two types of particles that have different charges and color. The amount of incident radiation (visible light, infrared, etc.) that is absorbed by the laminate can be modified by providing a voltage between the electrode layers.

11 Claims, 6 Drawing Sheets

(56) References Cited

U.S. PATENT DOCUMENTS

| | | |
|---|---|---|
| 7,116,318 B2 | 10/2006 | Amundson et al. |
| 7,144,942 B2 | 12/2006 | Zang et al. |
| 7,312,784 B2 | 12/2007 | Baucom et al. |
| 7,339,715 B2 | 3/2008 | Webber et al. |
| 7,411,719 B2 | 8/2008 | Paolini, Jr. et al. |
| 7,453,445 B2 | 11/2008 | Amundson |
| 7,535,624 B2 | 5/2009 | Amundson et al. |
| 7,679,814 B2 | 3/2010 | Paolini, Jr. et al. |
| 7,715,088 B2 | 5/2010 | Liang et al. |
| 7,839,564 B2 | 11/2010 | Whitesides et al. |
| 8,009,348 B2 | 8/2011 | Zehner et al. |
| 8,552,299 B2 * | 10/2013 | Rogers ................ H01L 25/50 |
| | | 174/254 |
| 9,279,906 B2 | 3/2016 | Kang |
| 9,812,984 B2 * | 11/2017 | Yoscovich ............ H02M 7/42 |
| 2005/0247558 A1 * | 11/2005 | Anex .................... F04B 19/006 |
| | | 204/275.1 |
| 2010/0171752 A1 * | 7/2010 | Kim ...................... G09G 3/344 |
| | | 345/589 |
| 2015/0005720 A1 | 1/2015 | Zang |
| 2015/0277160 A1 | 10/2015 | Laxton |
| 2016/0012710 A1 | 1/2016 | Lu et al. |

* cited by examiner

SOLAR TEMPERATURE REGULATION SYSTEM FOR A FLUID

RELATED APPLICATIONS

This application claims priority to U.S. Provisional Patent Application No. 62/738,323, filed Sep. 28, 2018. All patents, published applications, and references disclosed herein are incorporated by reference in their entireties.

FIELD OF THE INVENTION

The present invention relates to the field of temperature regulation devices, more specifically to systems for regulating the temperature of a fluid by actively altering the albedo of the materials that the fluid contacts. (Albedo is the proportion of incident light or radiation that is reflected by a surface.)

BACKGROUND OF THE INVENTION

Pool heating systems are designed in a variety of configurations, but generally operate on a system of moving the water from the reservoir to a heater and then returning the water to the reservoir. Some pool heaters have used electrical heating elements, or other energy intensive methods to raise water temperature. These systems are undesirable as they can be costly to run.

Other systems have utilized solar energy to heat pools or to provide domestic hot water. Typically, the solar reservoir is placed outside of the pool, often resting near the pool, sometimes even on top of a roof near the pool. Water is pumped into the reservoir where solar energy absorbed by the device heats the water. Current solar systems still have the disadvantage of requiring a constant energy input to pump the water to and from the reservoir. Additionally, these systems can take up large amounts of space if placed near a pool, or require difficult installation on a rooftop.

SUMMARY OF THE INVENTION

Aspects of the present invention overcome the drawbacks of previous systems and methods by providing systems and methods that include a solar heating system for fluids (e.g., water) that do not require a continuous energy input and that is placed adjacent to a reservoir of the fluid. In some embodiments, the system comprises a film including a bistable electrophoretic medium that is coupled to a temperature sensor and a controller. The controller can switch the film between a light-absorbing state (i.e., dark) and a light-reflective state (i.e., white) when the temperature of the fluid exceeds a set point.

In accordance with one aspect of the invention, a temperature regulation system includes a laminate material that has a first light transmissive electrode layer, a rear electrode layer, and a bistable electrophoretic medium disposed between the first and second electrode layer. The electrophoretic medium includes first particles that have a first electrophoretic mobility and have a first color, and second particles that have a second electrophoretic mobility and have a second color, wherein the first electrophoretic mobility and the second electrophoretic mobility are different, and wherein the first color and the second color are different. The electrophoretic medium may be encapsulated in a collagen material, or the electrophoretic medium may be held in an array of microcells, or the electrophoretic medium may be dispersed through a polymer. The system further includes a temperature sensor in thermal contact with the fluid, a voltage source for supplying a voltage to the electrophoretic medium, and a controller in electrical communication with the temperature sensor and the voltage source. The controller is configured to execute a program stored in the controller to apply a voltage to the electrophoretic medium based on a temperature measured by the temperature sensor. When the first particles are adjacent to the light-transmissive electrode layer, the laminate material has a first albedo and when the second particles are adjacent to the light-transmissive electrode layer, the laminate material has a second albedo. In some embodiments, the first color is black and the second color is white.

A system according to the invention may be incorporated into the structure of a pool, e.g., as a liner. The invention may be incorporated into the structure of a building, e.g., a roof. The invention may be incorporated into a vehicle, e.g., a car or truck.

The voltage source may be line voltage, a battery, or a photovoltaic. In embodiments where the controller is in contact with the fluid, the controller may be encapsulated to prevent ingress of the fluid into the electronics, i.e., the controller may be waterproofed. In some aspects, the electrical communication between the controller and the voltage source is wireless.

In another aspect, the laminate material may be used to create time-varying patterns in a container of a fluid. For example, the laminate may make up the pool bottom lane markers or the pool wall targets. The laminate material may serve a dual purpose of controlling the temperature of the pool and marking the lanes of the pool. In so-called long course pools, the laminate material may be arranged so that it allows the pool to be alternatively labeled for swimming the length of the pool or across the pool.

It is to be appreciated that the features described above can be combined in any number of various ways to describe systems or methods that incorporate features disclosed herein.

The foregoing advantages of the invention will appear in the detailed description that follows. In the description, reference is made to the accompanying drawings that illustrate preferred aspects.

BRIEF DESCRIPTION OF THE DRAWINGS

In FIG. 1A the dark pigment is facing toward the sun and will absorb solar energy to increase the temperature of a fluid.

In FIG. 1B the reflective pigment is facing toward the sun and will reflect solar energy so that the temperature of a fluid is not increased.

Figure 1A:
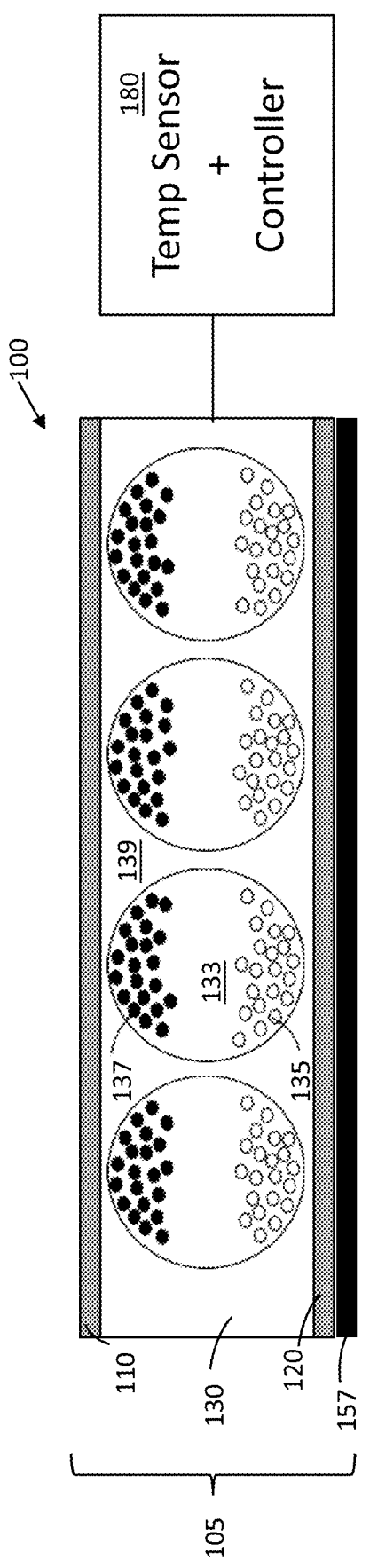
FIG. 1A illustrates a temperature regulation system of the invention.

The invention may be embodied in several forms without departing from its spirit or essential characteristics. The scope of the invention is defined in the appended claims, rather than in the specific description preceding them. All aspects that fall within the meaning and range of equivalency of the claims are therefore intended to be embraced by the claims.

Like reference numerals will be used to refer to like parts from Figure to Figure in the following description of the drawings.

DETAILED DESCRIPTION

The invention provides a temperature regulating system for a fluid that includes a thermally-responsive film that may be solar-absorbing or solar-reflective. The invention is robust and easy to implement. In general, a temperature sensor is coupled to a controller that switches the state of an electrophoretic film between a light and dark state depending upon whether the fluid is at the desired temperature. The electrophoretic fluid typically comprises two oppositely charged particles; a dark, light-absorbing particle and a light, light-reflecting particle. Because the film is in thermal contact with a reservoir of fluid, the film acts as a solar absorber and transfers heat to the fluid. The film acts as both a solar absorber and a solar reflector by continuously cycling between heating and cooling. This constant cycling prevents excessive heating and cooling of the fluid and helps maintain a normalized temperature range.

The invention is intended to be used with electrophoretic media of the type developed by E Ink Corporation (Billerica, Mass.) and described in the patents and patent publications listed below. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Microcell structures, wall materials, and methods of forming microcells; see for example U.S. Pat. Nos. 7,072,095; and 9,279,906;

(d) Methods for filling and sealing microcells; see for example U.S. Pat. Nos. 7,144,942; and 7,715,088;

(e) Films and sub-assemblies containing electro-optic materials; see for example U.S. Pat. Nos. 6,982,178; and 7,839,564;

(f) Backplanes, adhesive layers and other auxiliary layers and methods used in displays; see for example U.S. Pat. Nos. 7,116,318; and 7,535,624;

(g) Color formation and color adjustment; see for example U.S. Pat. Nos. 7,075,502; and 7,839,564;

(h) Methods for driving displays; see for example U.S. Pat. Nos. 7,012,600; and 7,453,445;

(i) Applications of displays; see for example U.S. Pat. Nos. 7,312,784; and 8,009,348;

(j) Non-electrophoretic displays, as described in U.S. Pat. No. 6,241,921; and U.S. Patent Application Publication Nos. 2015/0277160; 2015/0005720; and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

The invention will now be described more specifically with reference to the following aspects. It is to be noted that the following aspects are presented herein for purpose of illustration and description only. It is not intended to be exhaustive or to be limited to the precise form disclosed.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Furthermore, the disclosed subject matter may be implemented as a system, method, apparatus, or article of manufacture using standard programming and/or engineering techniques and/or programming to produce hardware, firmware, software, or any combination thereof to implement aspects detailed herein.

As used herein, the term "controller" may include one or more processors and memories and/or one or more programmable hardware elements. As used herein, the term "controller" are intended to include any types of processors, CPUs, microcontrollers, digital signal processors, or other devices capable of executing software instructions.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which configuration data and programs may be stored and/or data communications may be buffered. The term "memory" may also include other types of known or future developed memory or combinations thereof.

Figure 1B:
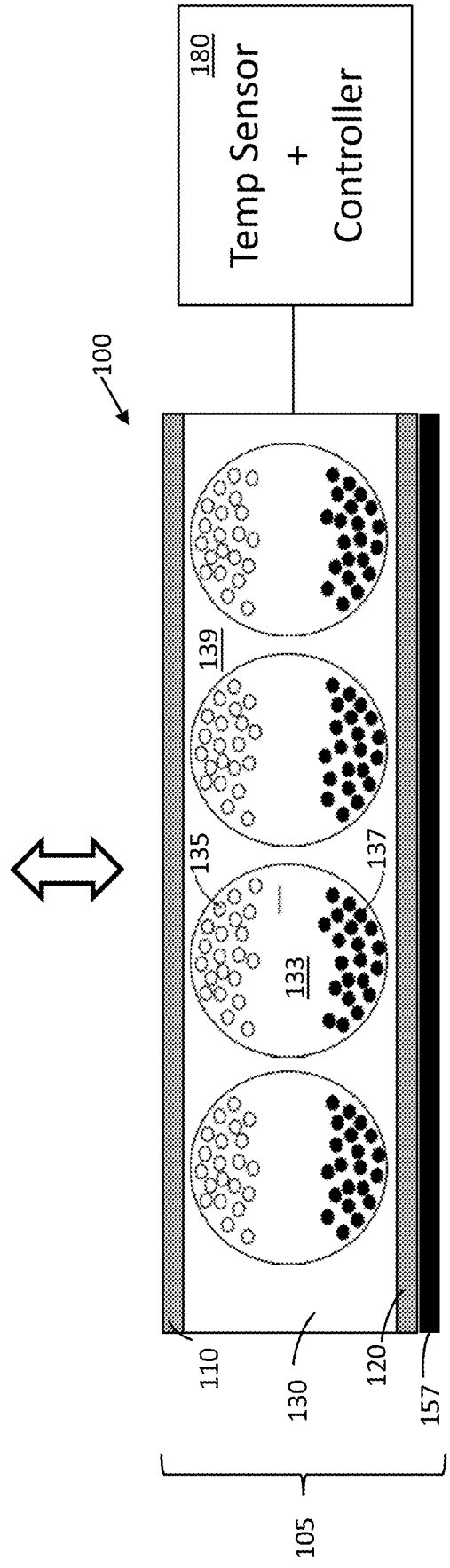
FIG. 1B illustrates a temperature regulation system of the invention.

An exemplary solar temperature control system is illustrated in FIG. 1A and FIG. 1B. System 100 normally comprises an EPD film 105, which includes a layer of electrophoretic material 130 and at least two electrode layers 110 and 120 disposed on opposed sides of the electrophoretic material 130, at least one of these two layers being light-transmissive. The front (a.k.a. top) electrode 110 is typically the sun-facing side of the system 100, in which case the front electrode 110 may be a transparent conductor, such as Indium Tin Oxide (ITO) (which in some cases may be deposited onto a transparent substrate, such as polyethylene terephthalate (PET)). The rear electrode 120 may also be transparent, however it does not need to be, and may be constructed from a conductive polymer or metalized polymer, such as Mylar. The layer of electrophoretic material 130 may include microcapsules 133, holding electrophoretic pigment particles 135 and 137 and a solvent, with the microcapsules 133 dispersed in a polymeric binder 139. Nonetheless, it is understood that the electrophoretic medium (particles 135 and 137 and solvent) may be enclosed in microcells (microcups) or distributed in a polymer without a surrounding microcapsule (e.g., PDEPID design described above). Typically, the pigment particles 137 and 135 are controlled (displaced) with an electric field produced between the front electrode 110 and the rear electrode 120. The EPD film 105 may also include an adhesive layer 157, which is used to affix the EPD film 105 to a surface, for example the bottom of a swimming pool.

A system 100 additionally includes a temperature sensor and controller 180. The temperature sensor and controller may be individual components or they may be integrated into a single unit. The temperature sensor may be a digital thermometer, a thermistor, or a bimetal coil. The temperature sensor will either communicate with the controller, or the temperature sensor will activate the controller such that the state of the EPD film 105 will be switched from dark (FIG. 1A) to light (FIG. 1B) when the desired temperature is met.

The system 100 may be placed in a fluid such that an incident light side is exposed to a light source such as the sun. If the temperature sensor detects that the fluid temperature is below a predetermined temperature, the controller executes a program instructing a switching voltage to be supplied to the EPD film 105. The electric field created as a result of the first voltage causes the first particles 137 to move to the incident light surface, i.e., toward electrode 110, while the second particles 135 move away from the incident light surface. (See FIG. 1A.) Accordingly, the first particles 137, being exposed to the direct light and having a greater albedo, will absorb radiation energy from the light, which will be transferred to the fluid, thereby heating the fluid.

If the temperature sensor detects that the fluid temperature is at or above the predetermined temperature, the controller executes the program causing a second electric field to be presented, which causes the first particles 137 to move away from the incident light surface and the second particles 135 to move towards it. The second particles 135, having a lower albedo, will reflect the radiation energy, causing the pool water to not heat up as much. (See FIG. 1B.) Typically, the pool will cool radiatively once the sun is no longer shining directly on the water.

Typically, the first particles 137 are black, while the second particles 135 are white, however other colors may could be utilized in different aspects. The temperature sensor and controller can be coupled on the EPD film 105, or, in alternative aspects, they may be located in a spaced apart relationship with the EPD film 105. In some embodiments, the temperature sensor is in the reservoir of fluid and the controller is not. The temperature sensor and controller may communicate via wires or wirelessly. In some aspects, the system 100 may further comprise a photovoltaic power cell that is in electrical communication with the controller and/or the temperature sensor to provide power to the controller and/or the temperature sensor. The photovoltaic may also be a source of voltage for switching the EPD film 105 between states. The controller and temperature sensor and the voltage source may be enclosed in a waterproof housing. In aspects where a photovoltaic power cell is included, the power cell may also be enclosed in the waterproof housing. A photovoltaic may further provide a switching function in that the system 100 will be dormant until there is sufficient solar flux to provide power to the system 100.

Figure 2:
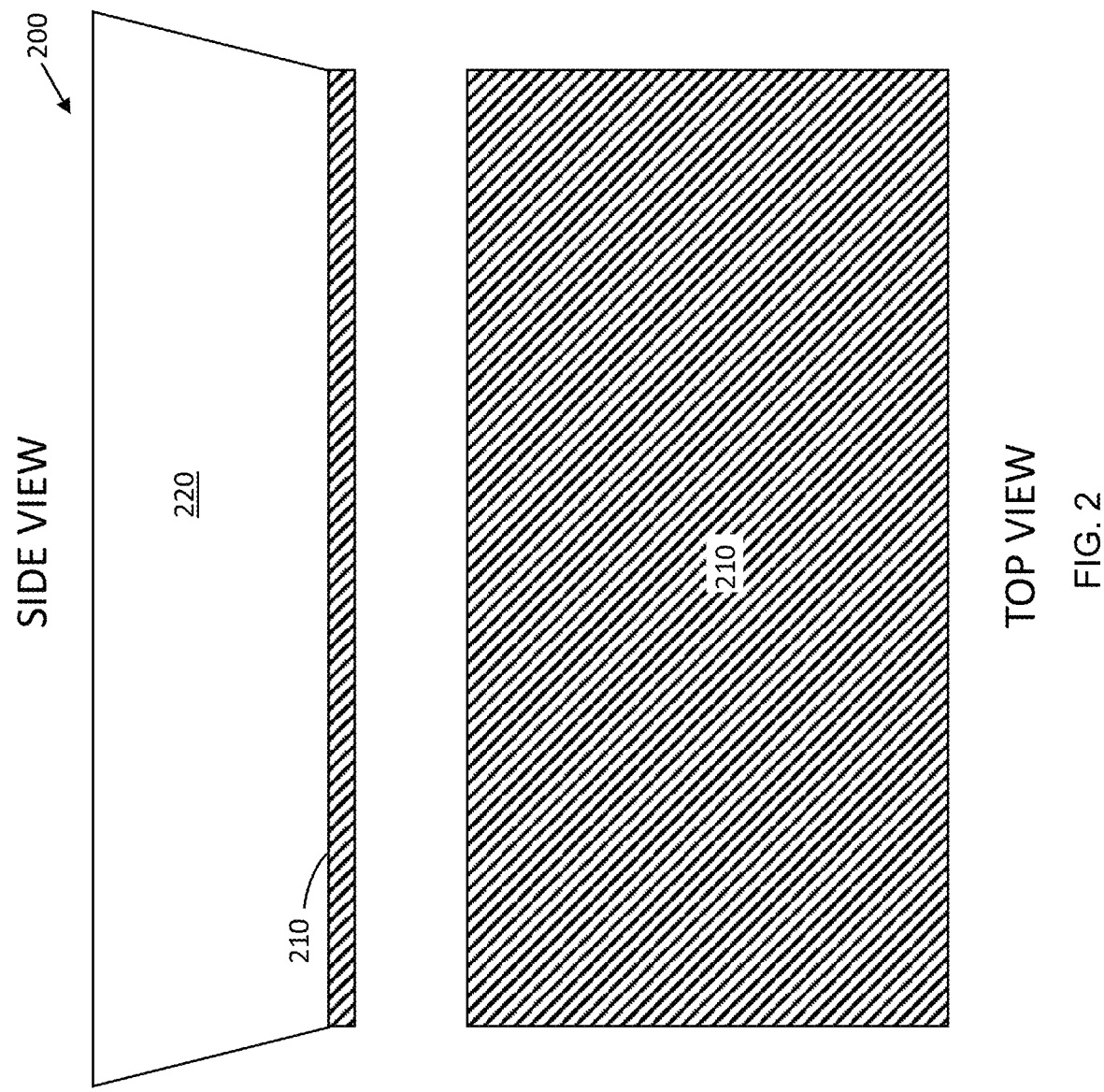
FIG. 2 illustrates a solar temperature regulation system incorporated into the floor of a pool.

FIG. 2 illustrates an embodiment of the invention whereby the EPD film 105 is incorporated in the floor 210 of a pool 200. As expected, the pool 200 is filled with a light transmissive fluid 220, e.g., water. The pool 200 is irradiated by the sun, whereby the EPD film 105 in the floor can be switched to regulate the temperature of the fluid 220. The top view shows a view through the light transmissive fluid 220 to the bottom of the floor 210 of the pool 200.

Figure 3:
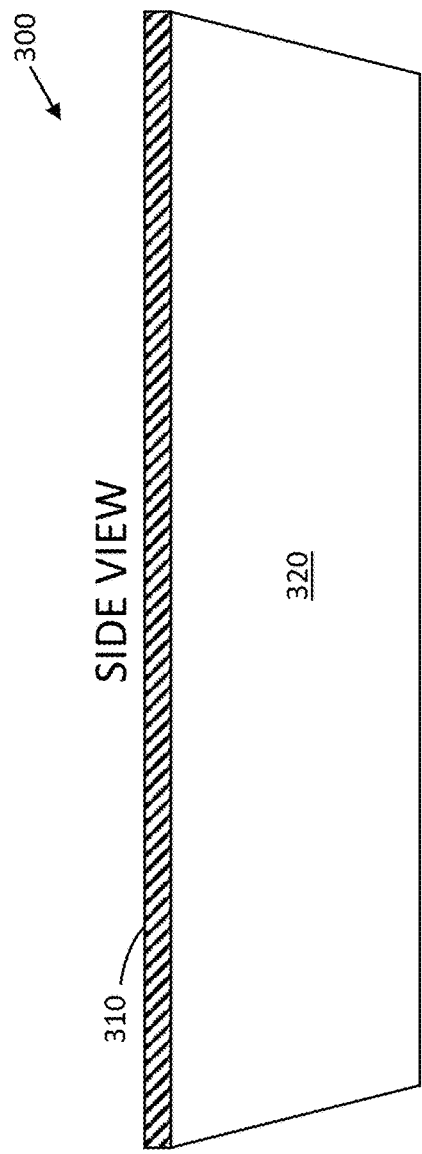
FIG. 3 illustrates a solar temperature regulation system incorporated into a pool cover.
Figure 3:
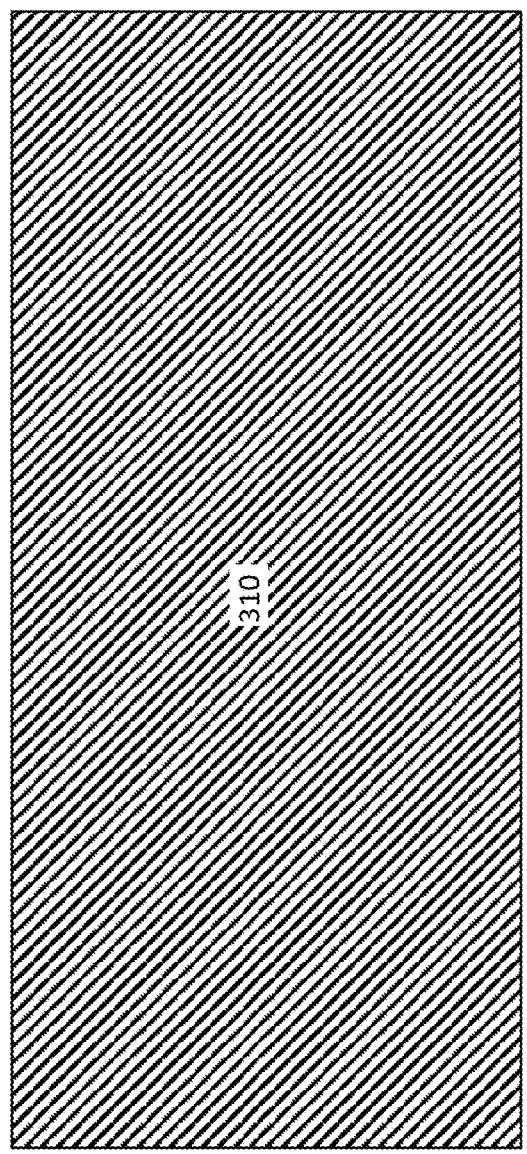

FIG. 3 show an embodiment of the invention whereby the EPD film is incorporated into a cover 310 for a reservoir of fluid 320, e.g., a pool cover. FIG. 3 is preferred for applications where the fluid 320 is not light transmissive, but the temperature needs to be maintained. For example, the embodiment of FIG. 3 may be used to regulate the temperature of a digestive slurry for an anaerobic digester. In some instanced the cover 310 is removable. While FIG. 3 shows an embodiment similar to a swimming pool, it is to be understood that the concept of using a variable albedo surface to regulate the temperature of a fluid can be applied generally to structures, such as buildings or vehicles. For example, a roof of a building may incorporate a system of the invention in order to regulate the temperature of the fluid (e.g., air) inside the building. Alternatively, a car or a truck trailer may include a system of the invention in order to regulate the temperature of the air inside the vehicle.

Figure 4:
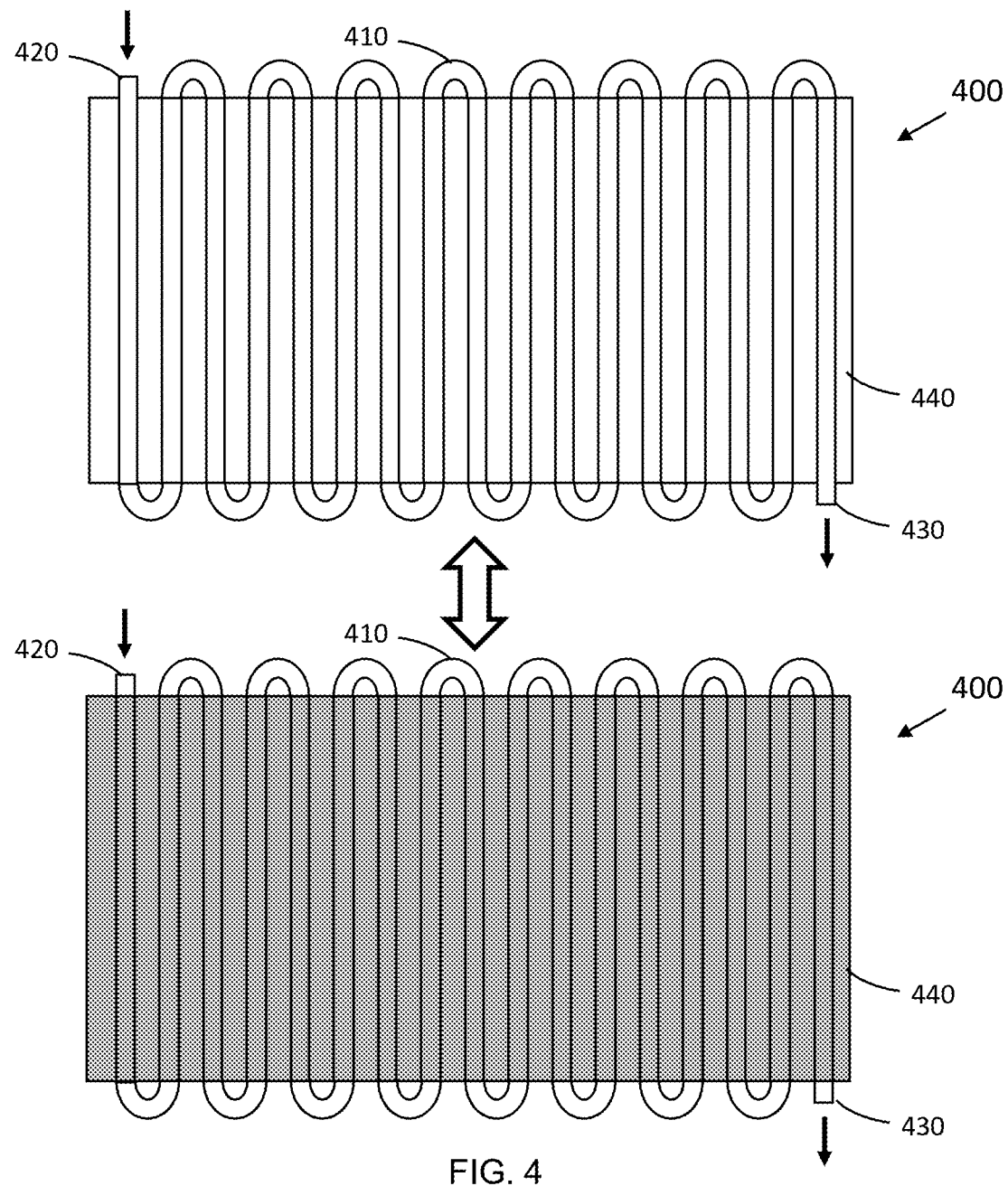
FIG. 4 illustrates an alternative solar temperature regulation system.

FIG. 4 shows yet another non-limiting aspect of a temperature regulation system 400. The temperature regulation device 400 comprises an internal reservoir 410 configured to retain a fluid, an inlet 420 and an outlet 430. The wall on the incident light side 440 of the temperature regulation device 400 includes an EPD film 105, as described above. A fluid can be pumped into the reservoir 310 through the inlet 320 and may exit the reservoir via the outlet 330. In some aspects, the internal reservoir 410 may be configured to maximize the thermal contact between the fluid and the EPD film 105. Such a device may be used to produce, e.g., domestic or industrial hot water.

Figure 5:
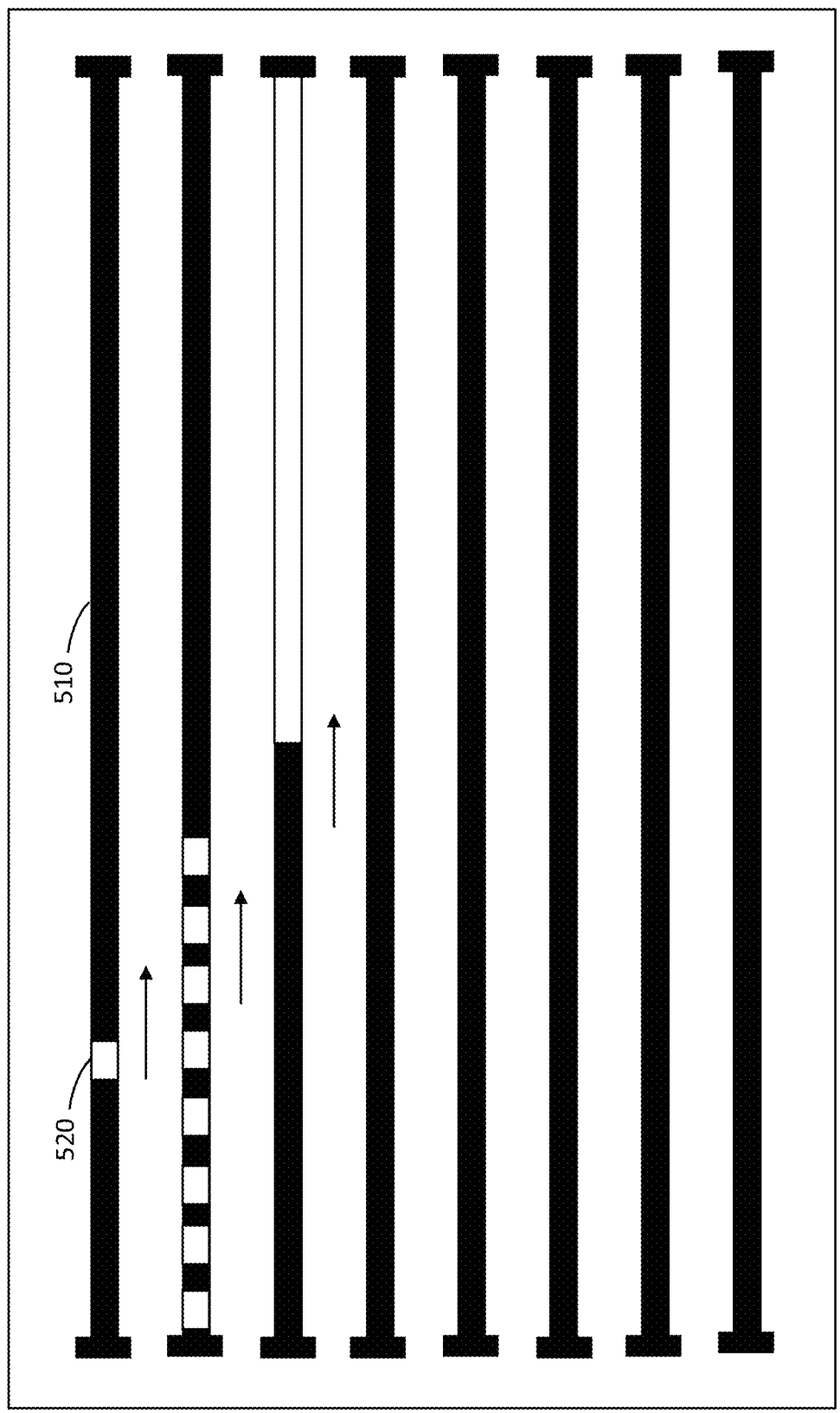
FIG. 5 illustrates an advanced solar regulation system incorporating pool-bottom lane markers. In some embodiments, the pool-bottom lane markers include segmented electrodes that can be switched to provide information or to pace a swimmer.
Figure 6:
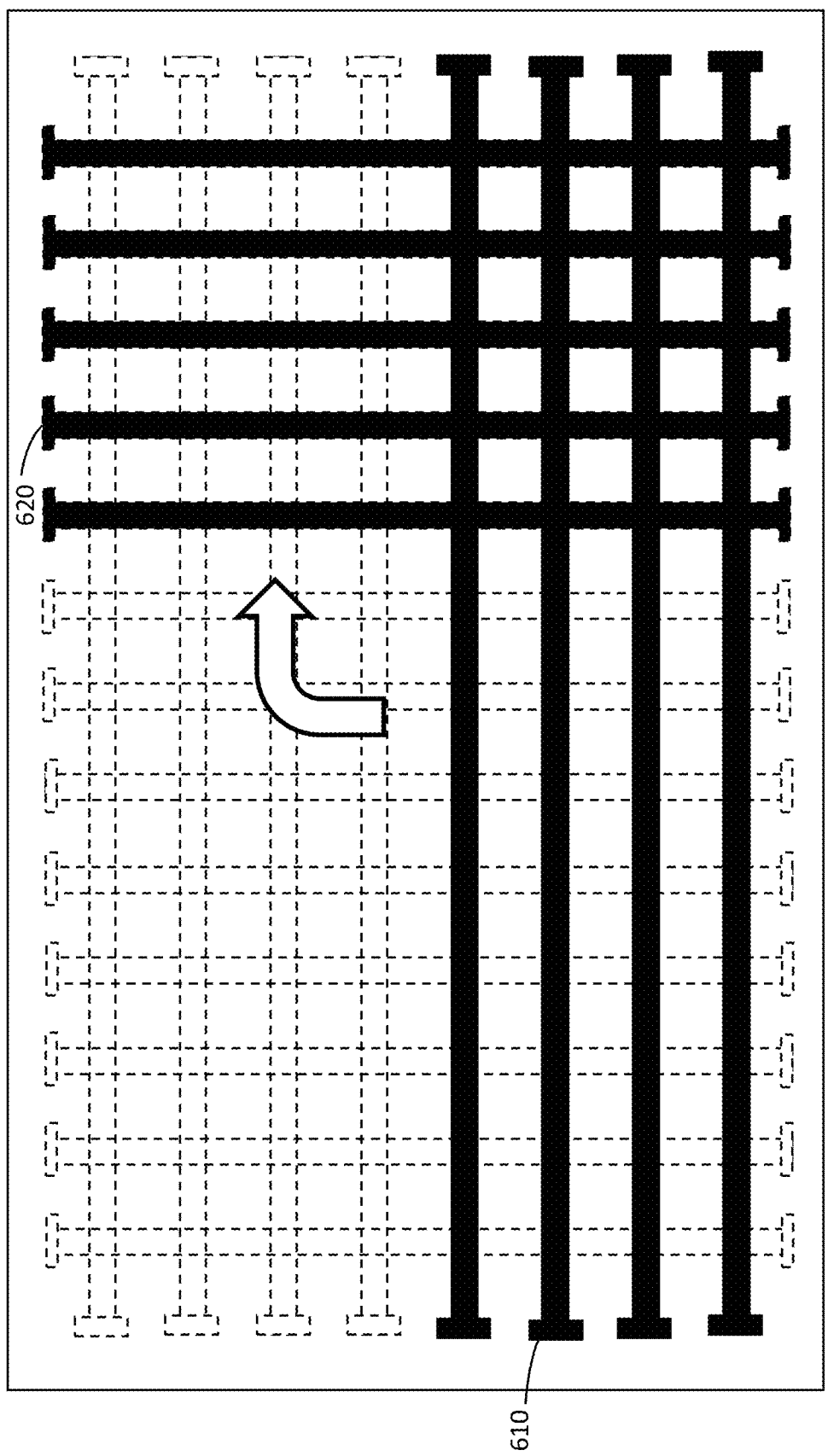
FIG. 6 illustrates an advanced solar regulation system that allows a long course swimming pool to switch the pool-bottom lane markers between long course and short course, i.e. across the pool.

Advanced embodiments may use segmented electrodes to provide designs or signals with the EPD film, as shown in FIGS. 5 and 6. As shown in FIG. 5, portions of the bottom of a pool can be configured so that areas of the bottom of the pool can switch between, e.g., all dark, all light, and lane markers 510. In an embodiment of FIG. 5, the pool bottom may be covered with a plurality of EPD films 520 that are individually addressable. Such EPD films may be in the shape of, e.g., pool tiles, e.g., approximately 25 cm×25 cm squares (e.g., 1 U.S. foot by 1 U.S. foot). In advanced embodiments, the controller may be coordinated with a timing system, whereby a pace can be set with the speed of the advancement of a light (or dark) colored segment of EPD film. In other embodiments, portions or all of the pool bottom may flash to indicate the start of a race. Such visual cues are particularly important for competitive swimmers with hearing impairments who may not otherwise hear the starting tone. Of course, a system of the invention may only comprise the lane marker portions and not cover the entire pool bottom. Such systems may be preferred indoors where there is less need for solar temperature regulation. In another embodiment, illustrated in FIG. 6, segmented EPD films can be arranged so that they allow the pool-bottom lane markers to switch between long course (e.g., 50 meter) segments 610 that traverse the longer length of the pool and short course (e.g., 25 meter, e.g., 25 feet) segments 620 that traverse the shorter length of the pool. Pools having a switching pool-bottom lane marker system of FIG. 6 may also incorporate the pacing features illustrated in FIG. 5.

The foregoing has been a detailed description of illustrative aspects of the invention. Various modifications and additions can be made without departing from the scope thereof. Furthermore, since numerous modifications and changes will readily occur to those skilled in the art, it is not desired to limit the invention to the exact construction and operation shown and described. For example, any of the various features described herein can be combined with some or all of the other features described herein according to alternate aspects. While the preferred aspect has been described, the details may be changed without departing from the invention, which is defined by the claims.

Finally, it is expressly contemplated that any of the processes or steps described herein may be combined, eliminated, or reordered. In other aspects, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

The invention claimed is:

1. A temperature regulating device comprising:
a structure comprising an internal reservoir configured to retain a fluid, the reservoir including an inlet in fluid communication with the internal reservoir and an outlet in fluid communication with the internal reservoir, the structure having an incident light surface comprising capsules containing (i) first particles having a first electrophoretic mobility and having a first color and (ii) second particles having a second electrophoretic mobility and having a second color, wherein the first electrophoretic mobility and the second electrophoretic mobility are different, and wherein the first color and the second color are different;
a temperature sensor in contact with the fluid and configured to measure a temperature of the fluid;
a voltage source for applying a voltage to the capsules; and
a controller in electrical communication with the temperature sensor and the voltage source, the controller being configured to execute a program stored in the controller to apply a level of the voltage to the capsules based on a temperature of the fluid received from the temperature sensor.

2. The temperature regulating device of claim 1, wherein the capsules further comprise a carrier medium and the first particles and second particles are disposed in the carrier medium.

3. The temperature regulating device of claim 1, wherein the first color has a first albedo and the second color has a second albedo, and the first albedo is greater than the second albedo.

4. The temperature regulating device of claim 3, wherein the first color is black and the second color is white.

5. The temperature regulating device of claim 1, wherein the incident light surface is a roof of a vehicle.

6. The temperature regulating device of claim 1, wherein the incident light surface is a roof of a dwelling.

7. The temperature regulating device of claim 1, wherein the electrical communication between the controller and the voltage source is wireless.

8. The temperature regulating device of claim 1, wherein the controller and the voltage source are enclosed in a waterproof housing.

9. The temperature regulating device of claim 1, further comprising a photovoltaic power supply in electrical communication with the controller.

10. The temperature regulating device of claim 9, wherein the controller, the photovoltaic power supply, and the voltage source are enclosed in a waterproof housing.

11. The temperature regulating device of claim 1, wherein the controller executes the program stored in the controller to apply a first level of the voltage to the capsules when a temperature received from the temperature sensor is below a predetermined temperature and to apply a second level of the voltage to the capsules when a temperature received from the temperature sensor is at or above the predetermined temperature.

* * * * *